US005232140A

United States Patent [19]

Gregory et al.

[11] Patent Number: 5,232,140

[45] Date of Patent: Aug. 3, 1993

[54] MECHANISM FOR POSITIONING TRACTORS

[75] Inventors: Floyd A. Gregory, Binghamton; James T. Holton; John Maliwacki, both of Endwell; Lawrence A. Stone, Endicott, all of N.Y.

[73] Assignee: International Business Machines Corporation, Armonk, N.Y.

[21] Appl. No.: 662,863

[22] Filed: Mar. 1, 1991

[51] Int. Cl.[5] .......... G03B 1/30; G05G 1/10; F16D 67/02

[52] U.S. Cl. .......... 226/74; 74/553; 74/554; 192/17 R; 192/95

[58] Field of Search .......... 226/74, 75, 79; 400/616.1; 74/553, 554; 192/7, 17 R, 95

[56] References Cited

U.S. PATENT DOCUMENTS

| | | | |
|---|---|---|---|
| 2,285,197 | 6/1942 | Euth | 400/616.1 X |
| 3,006,520 | 10/1961 | House | 226/75 |
| 3,407,981 | 10/1968 | Staugaard | 226/74 X |
| 3,420,352 | 1/1969 | Moran et al. | 400/616.1 X |
| 3,477,626 | 11/1969 | Hilpert | 226/74 X |
| 3,578,138 | 5/1971 | Cantwell | 400/616.1 |
| 4,546,908 | 10/1985 | Cassese et al. | 226/74 |
| 4,549,716 | 10/1985 | Warren | 192/95 X |

FOREIGN PATENT DOCUMENTS

| | | | |
|---|---|---|---|
| 2164215 | 3/1971 | Fed. Rep. of Germany | . |
| 848794 | 9/1960 | United Kingdom | 400/616.1 |

OTHER PUBLICATIONS

IBM Technical Disclosure Bulletin vol. 29 No. 12 May 1987.

*Primary Examiner*—Daniel P. Stodola
*Assistant Examiner*—Michael R. Mansen
*Attorney, Agent, or Firm*—John S. Gasper; Michael E. Belk

[57] ABSTRACT

Apparatus for use with a printer which has a pair of tractors that engage sprocket holes in the paper to adjust for different paper widths or to adjust the lateral position of the paper. The apparatus comprises a pair of coaxial lead screws, one attached to a rotatable shaft and the second rotatable on the shaft adjacent to and relative to the one lead screw. One tractor is coupled to each lead screw. Rotation of the one lead screw is obtained by a knob keyed to an end of the rotatable shaft. Rotation of the second lead screw is prevented during rotation of the knob by spring loaded fingers with detent elements engageable with detention gearing on the end of the second lead screw. Rotation of both screws is obtained by rotation and axial movement of the knob on the shaft so that a cam surface on the knob engages cams of the spring fingers to disengage detent elements from the detention gearing and drive gearing on the knob engages drive gearing on the second lead screw.

14 Claims, 6 Drawing Sheets

MECHANISM FOR POSITIONING TRACTORS

FIELD OF THE INVENTION

This invention relates to printers and particularly to a mechanism for adjusting the relative position and location of the tractors of a paper feeding system for use in line printers.

BACKGROUND OF THE INVENTION

The paper feeding system for band line impact printers comprises a pair of paper feeding tractors which engage pin feed holes at opposite edges of perforated paper and hold it in tension relative to the print forming elements of the printer. It is desirable that the tractors be movable separably to adjust for different widths of paper. It is also desirable that the tractors be movable together along the line of print for positioning the paper relative to the print elements. It is further desirable that the tractors be so movable by a mechanism which is simple to operate and which uses a single operating element such as a knob.

Mechanisms for moving tractors separably or jointly are of two general types, those using cables and those using lead screws. The invention relates to a tractor adjusting system using coaxial lead screws. Examples of tractor adjusting systems using coaxial lead screws for adjusting the spacing and position of paper feed tractors are shown in U.S. Pat. Nos. 3,578,138—Cantwell; 3,420,352—Moran et al and 3,006,520—House. A cable system for adjusting tractors with a single knob mechanism is shown in IBM Technical Disclosure Bulletin, Vol. 29 No. 12 of May 1987, pp. 5518-9. The mechanisms in all these cases have the disadvantages of having too many parts, of being complex and difficult to operate. In addition, they are not easy to assemble and disassemble when for instance it is necessary to repair or replace one of the tractor mechanism.

SUMMARY OF THE INVENTION

The invention overcomes the disadvantages by providing a paper feed system comprising a pair of spaced tractors and a tractor adjustment mechanism in which a pair of rotatable coaxial lead screw members are rotatable individually or together by operation of single operator means such as a knob element to change the spacing or shift the position of the tractors. The pair of tractors is supported on a drive shaft and the coaxial lead screw members which together form a guide shaft parallel with the drive shaft. Each tractor is movable by one lead screw. One lead screw member includes a shaft extension on which the other lead screw member, which is tubular, is rotatable. In accordance with the invention, the tubular lead screw member is provided with both drive means engageable for causing rotation and detention means engageable by detent means for restraining rotation. The operator means is shiftable axially on the shaft extension relative to the tubular lead screw and is provided with a first drive means forming a rotary drive connection with the shaft extension, second drive means engageable in response to shifting of the operator element with the drive means of the tubular screw member and disengagement means for disengaging the detent means from the detention means coincidentally with the engagement of the second drive means with the drive means on the tubular lead screw member. In the preferred embodiment of the invention, the detention means on tubular screw member comprises radial gearing and the drive connection comprises face gearing. The detent means comprises at least one flexure element with a fixed end and a deflectable end. The deflectable end is provided with catch means engageable with the radial gearing on the tubular lead screw member. Preferably the catch means also comprises radial gearing which thereby provides better accuracy in rotational positioning of the tubular lead screw member and hence more accurate lateral positioning of the associated tractor.

DETAILED DESCRIPTION OF THE INVENTION

Figure 1:
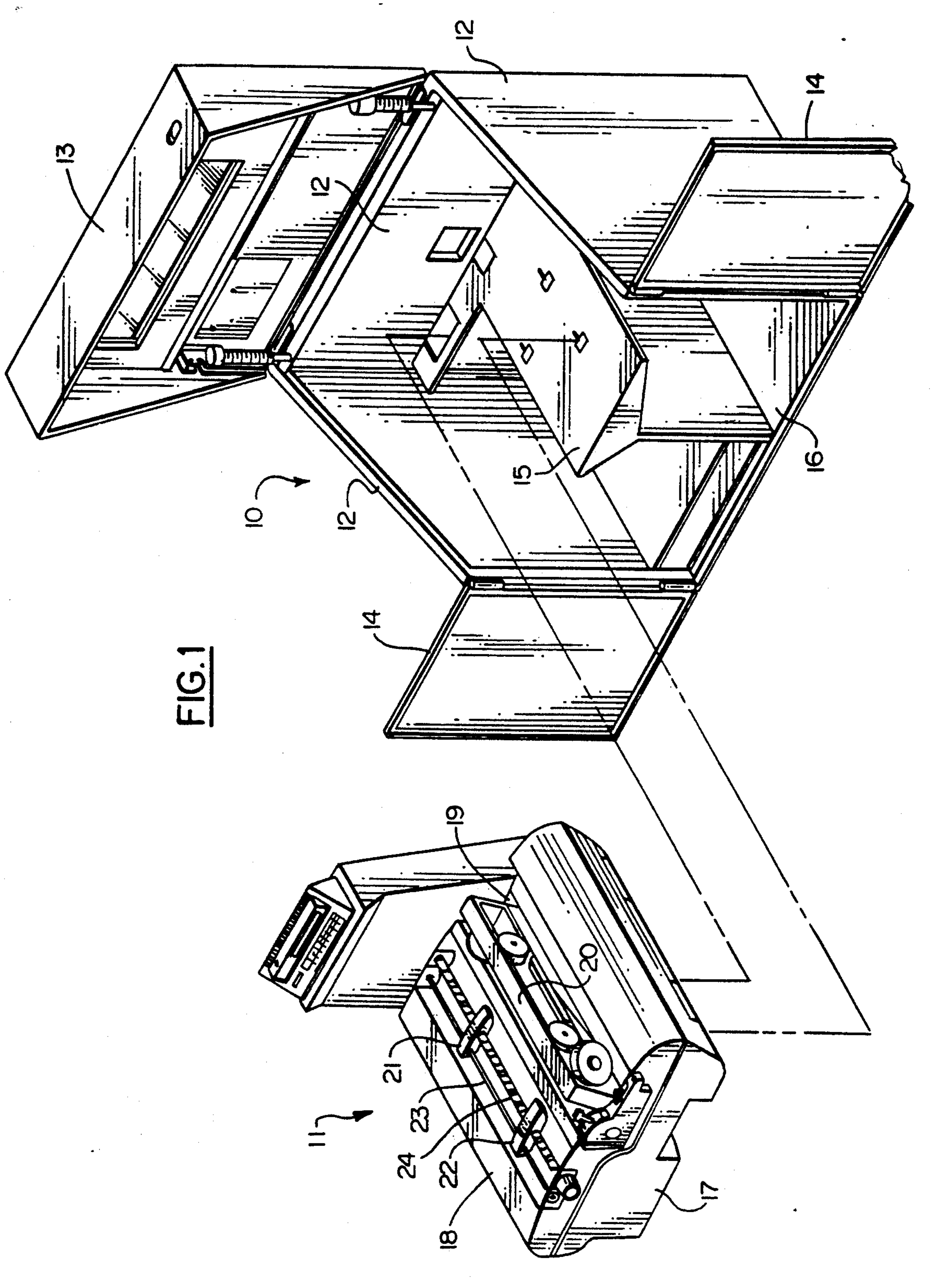
FIG. 1 is an exploded perspective view of a type of printer apparatus in which the invention is used.

As seen in FIG. 1, a printer apparatus comprises a cabinet 10 within which is installed a printer unit 11. The cabinet 10 has side walls 12 on which top door 13 and pair of front doors 14 are hingedly attached. A pedestal 15 on bottom wall 16 supports printer unit 11 within the cabinet 10. Stacks of folded paper (not shown) would rest on bottom wall 16 on the right and left sides of pedestal 15.

Printer unit 11 includes a casing having a base 17 and a cover 18 on which is mounted a hammer unit 19. A band and ink ribbon drive assembly 20 is mounted on the hammer unit 19 so that the type band and ink ribbon thereof are aligned with and separated from the hammer elements of the hammer unit 19 by a gap which defines a passageway for the ink ribbon and paper to be printed on. A system for feeding paper through the gap includes a pair of tractors 21 and 22 on one side of the print mechanism which engage pin feed holes along opposite margins of the paper. Supporting tractors 21 and 22 are parallel drive shaft 23 and guide shaft 24 both rotatably mounted on cover 18.

Figure 2:
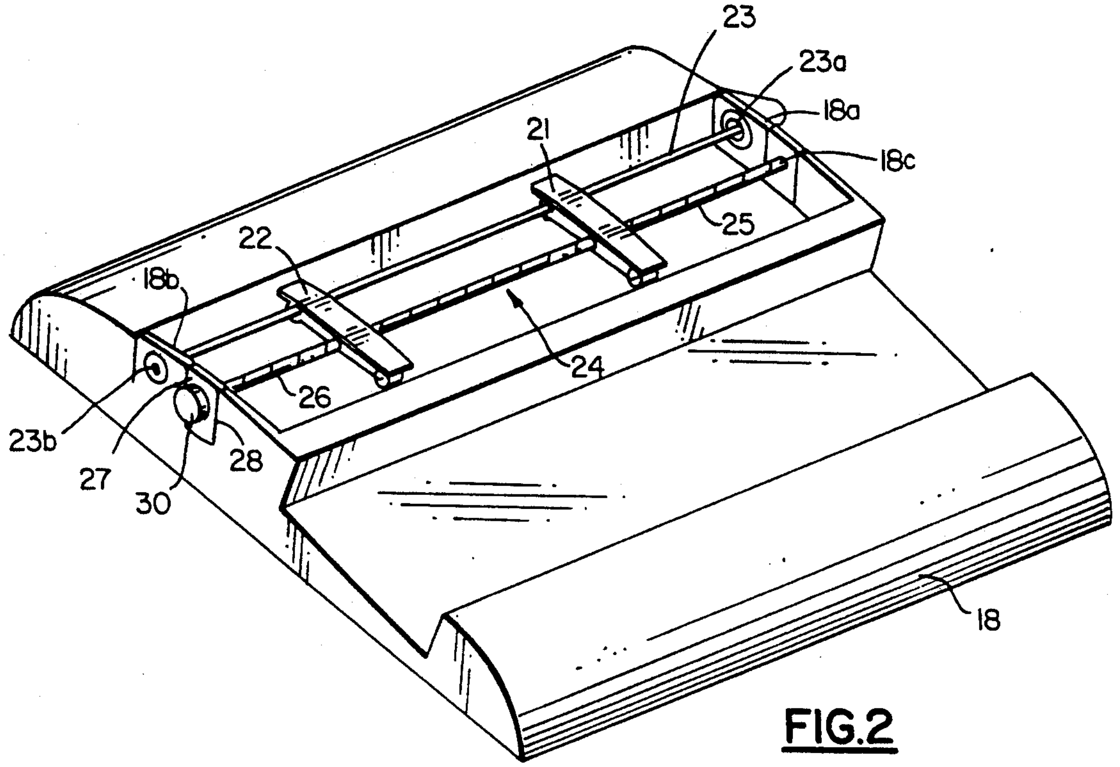
FIG. 2 is a perspective view of a part of the printer unit of FIG. 1 showing the paper feed mechanism which incorporates the invention.
Figure 11:
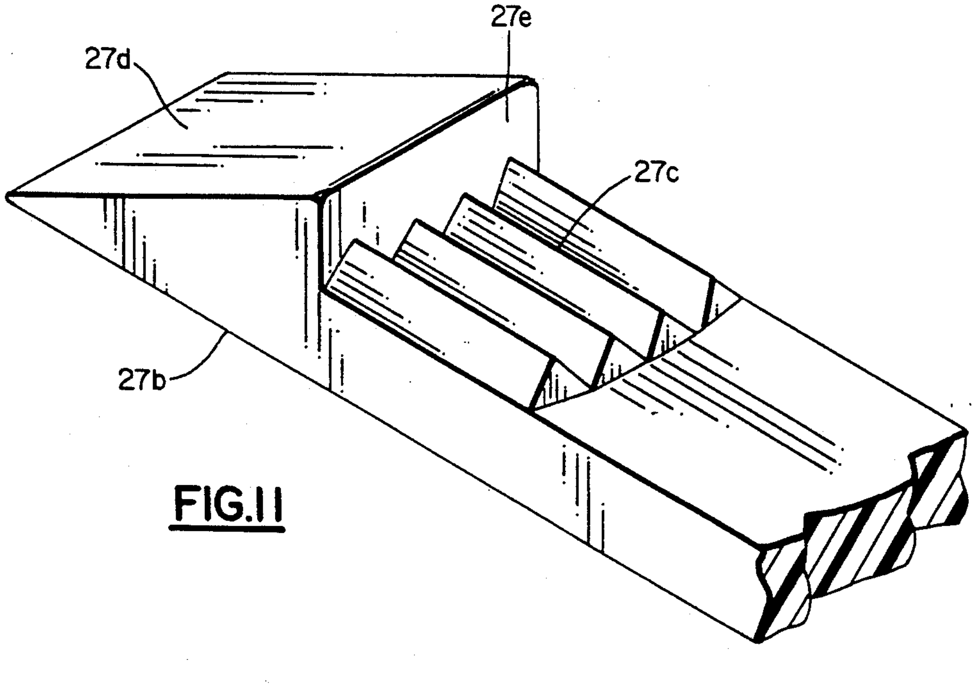
FIG. 11 is a fragment in perspective of one of the detent fingers of FIG. 3.

As seen in FIG. 2, drive shaft 23 is supported on cover 18 by bearings 23*a* and 23*b* force fitted into openings in side walls 18*a* and 18*b*. Drive shaft 23 is rotatable by a motor (not shown) also mounted on cover 18. As is well known, tractors 21 and 22 include sprockets operatively connected to drive shaft 23 in a fashion which allows the tractors to slide axially along the drive shaft 23.

In accordance with this invention, the guide shaft 24 is an assembly comprising coaxial lead screws 25 and 26 operatively connected to tractors 21 and 22 respectively. As seen in FIG. 2, one end of lead screw 25 is supported in a bore opening 18*c* in side wall 18*a* of cover 18 while the opposite end of lead screw is supported on cover 18 by bearing unit 27 which is preferably snap fitted into a cutout 28 in side wall 18*b*. A knob 30 on the end of guide shaft 24 rotates lead screws 25 and 26 to effect lateral movement of tractors 21 and 22.

The paper feed system is designed to vary the position of tractors 21 and 22 relative to hammer unit 19. This is accomplished by moving both tractors together. The system is also designed for use with a variety of paper widths. The printer can be set to receive a different width of paper while maintaining the same margin at one edge of the paper by moving only one tractor on the other edge of the paper.

Figure 3:
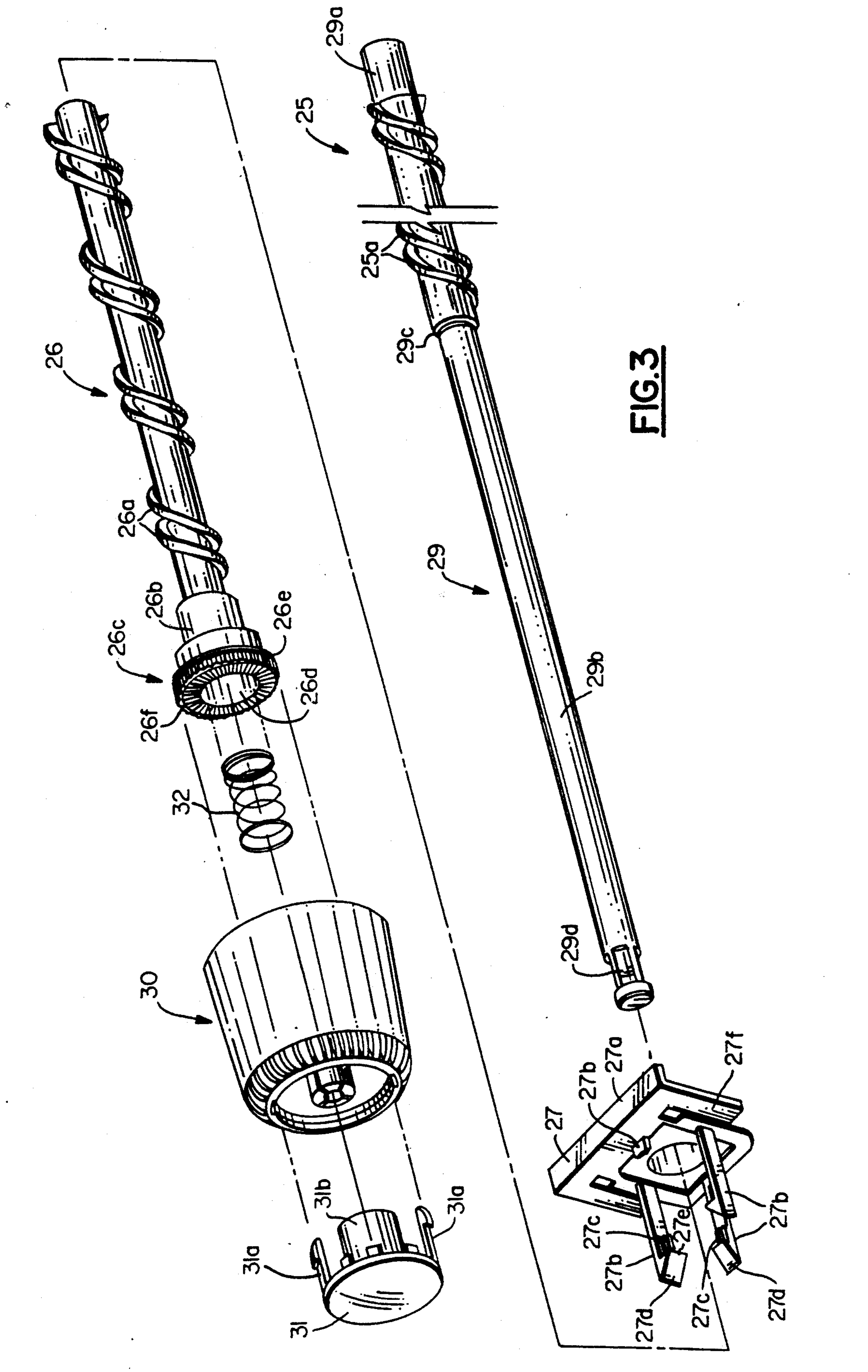
FIG. 3 is an exploded perspective view of the paper feed system incorporating the invention.
Figure 5:
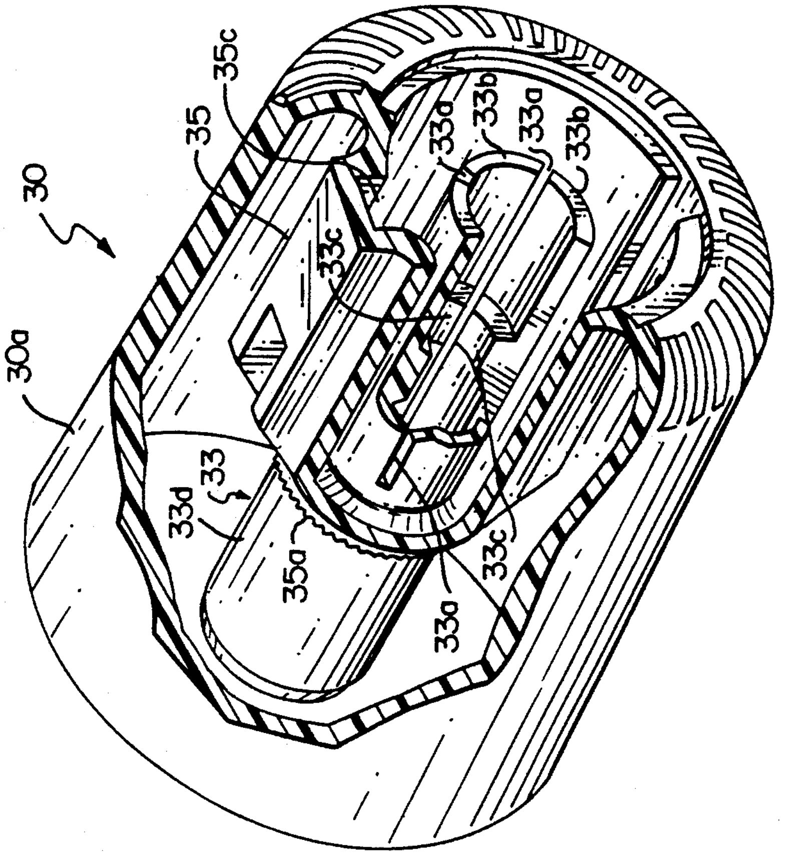
FIGS. 4 and 5 are perspective views showing opposite ends of the operating knob element part of the tractor adjustment mechanism of FIG. 2.
Figure 4:
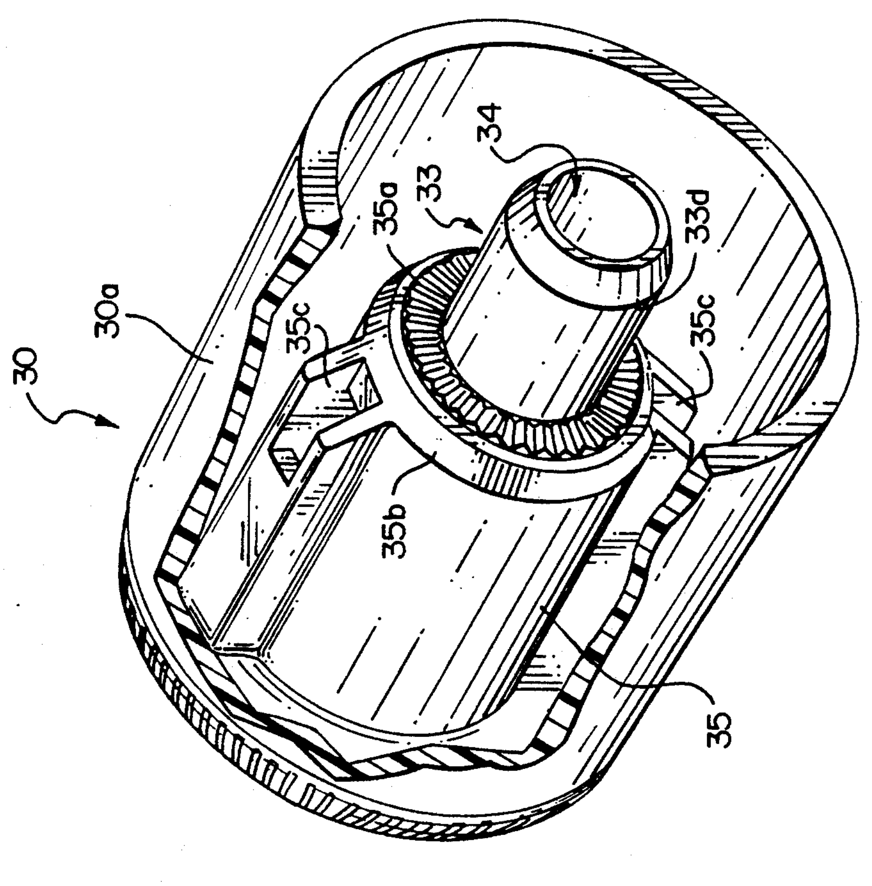
Figure 7:
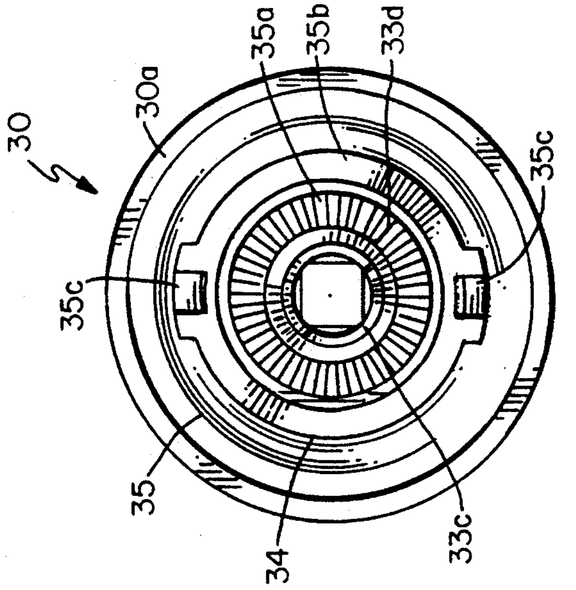
FIG. 7 is an end elevational view of the end of the knob element as seen in FIG. 4.
Figure 8:
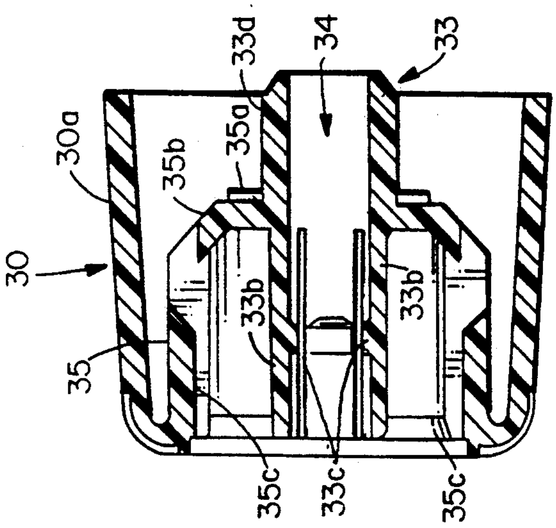
FIG. 8 is a section of the knob element taken along the lines 8—8 in FIG. 6.
Figure 6:
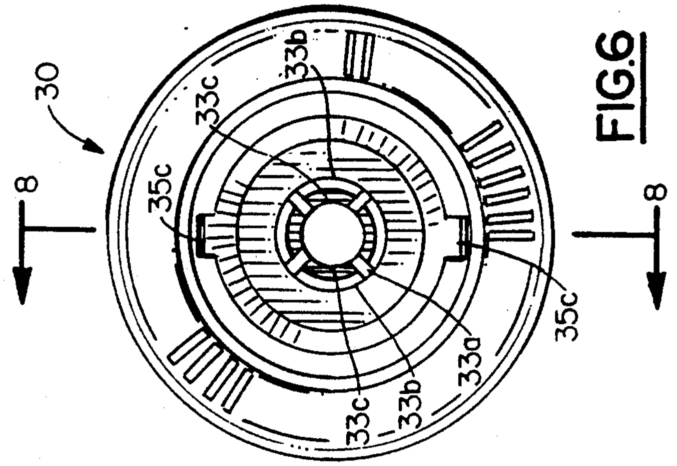
FIG. 6 is an end elevation of the knob element as seen in FIG. 5.

FIG. 3 shows the guide shaft 24 assembly as comprising a shaft 29 supporting lead screws 25 and 26, shaft 29 having a butt end 29*a* and extension 29*b* at opposite ends of the lead screw 25. Shaft 29 is preferably a steel shaft and lead screw 25 is molded and fixed directly onto shaft 29. Lead screw 26 is tubular and slips on and is supported by extension 29*b* of shaft 29. Extension 29*b* has a length great enough so that it extends beyond the end of lead screw 26. A shoulder 29*c* on shaft 29 provides axial constraint to tubular lead screw 26. Lead screw 26 has a bearing surface 26*b* which is rotatably supported and is axially slidable inside bore 27*a* of bearing unit 27 snap fitted onto side wall 18*b*. The assembly is rotatably supported on the other end by butt end 29*a* of shaft 29 being slidable into bore 18*c* of side wall 18*a* as previously described. A retainer cap 31 is snap fitted into knob 30 to hold knob 30 on shaft extension 29*a*. Lead screw 26 is also a molded polymer part. Lead screw 25 has dual right hand screw threads 25*a* which coact with corresponding threads or a follower element (not shown) on tractor 21. Lead screw 26 has dual right hand screw threads 26*a* that coact with corresponding threads or a follower element of tractor 22. Screw threads 25*a* and 26*a* have the same pitch. For ease of assembly, screw threads 25*a* are open at the butt shaft 29*a* for screwing into tractor 21 but are closed at the opposite end to limit the traverse distance of tractor 21 at the inside end of lead screw 25. Screw threads 26*a* on lead screw 26 are likewise open at the inside end near lead screw 25 for screwing into tractor 22 but closed at the outside end to limit the traverse distance of tractor 22. Rotation of lead screw 25 moves tractor 21, rotation of lead screw 26 moves tractor 22. Shaft extension 29*b* has axial key slots 29*d*. Knob 30 slides axially when manipulated between two operative positions on shaft extension 29*b*. In one operative position, knob 30 rotates lead screw 25 while lead screw 26 is prevented from rotating by detent means. In the second operative position, the detent means is disengaged and knob 30 will enable both lead screws 25 and 26 to rotate. Thus either tractor 21 is made movable relative to tractor 22 or both tractors are movable together along drive shaft 23 and guide shaft 24.

Attached to the outer end of lead screw 26 is drum 26*c* and which in accordance with this invention is provided with both the detention means for preventing and the drive connection for enabling rotation of lead screw 26. Drum 26*c* has a bore 26*d* which houses coil spring 32. In the preferred form, the detention means comprises circumferential gearing 26*e* and the drive connection comprises end gearing 26*f*. Gearing 26*e* preferably comprises teeth and grooves parallel with the axis of lead screw 26 in the manner of a spur gear. Gearing 26*f* comprises radial teeth and grooves in the manner of a flat or concave conical face gear. Cooperating with the detention gearing 26*e* to form the brake means are plural cantilever tab springs 27*b* each having detent gearing 27*c* that engage gearing 26*e* on drum 26*c*. The ends of the tab springs 27*b* have inwardly tapered cam surfaces 27*d* and a hooked end 27*e*. The bearing unit 27 is a polymer part with spring fingers 27*f* that snap onto the side wall 18*b* of cover 18. For ease of assembly and handling, the tab springs 27*b* are integral with the bearing unit 27. The tab springs 27*b* are made to be spring loaded inwardly so that detent gearing 27*c* normally engages detention gearing 26*e*. Also, hook ends 27*e* of tab springs 27*c* hook onto the end of drum 26*c* and prevent axial movement of lead screw 26 on shaft extension 29*b*.

As previously mentioned, knob 30 fits onto the end of shaft extension 29*b* of shaft 29. As seen more clearly in FIGS. 4–8, knob 30, which preferably is a molded polymer part, comprises a cylindrical outer shell 30*a* and a central tube 33 with a central bore 34 for receiving shaft extension 29*b* of shaft 29. Tube 33 is supported by and connected to outer shell 30*a* by cylindrical web 35 inside outer shell 30*a* and divides the interior of shell 30*a* into two chambers. Tube 33 is connected to and supported by web 35 approximately midway between its ends. One section of tube 33 inside one chamber formed by web 35 has longitudinal slots 33*a* to form a split sleeve with flexible fingers 33*b*. Inside each finger 33*b* is a key projection or tab 33*c* designed to be snap fitted into and to slide within key slots 29*d* on shaft extension 29*b* and thus form a rotary drive connection with shaft 29. The other section of tube 33 is outside web 35 in the other chamber formed thereby and takes the form of a solid sleeve and plunger 33*d* which slides on shaft extension 29*b* and fits within bore 26*d* of drum 26*c* of lead screw 26 where it engages and compresses coil spring 32. Concentric with plunger section 33*d* of tube 33 is gearing 35*a* formed on web 35 which is a drive connection engageable with the drive connection gearing 26*f* on lead screw 26. Gearing 35*a* has radial teeth and grooves in the form of a flat or conical face gear compatible with gearing 26*f*. Concentric with gearing 35*a* on web 35 is a conical camming surface 35*b* for camming tapered surfaces 27*d* on spring tabs 27*b* to disengage detent tabs 27*c* from detention gearing 26*e* on lead screw 26. Within web 35 are longitudinal grooves 35*c* for receiving spring fingers 31*a* of retainer cap 31. A sleeve 31*b* on cap 31 slips over fingers 33*b* to retain key tabs 33*c* in key slots 29*d* on shaft extension 29*b*.

Figure 9:
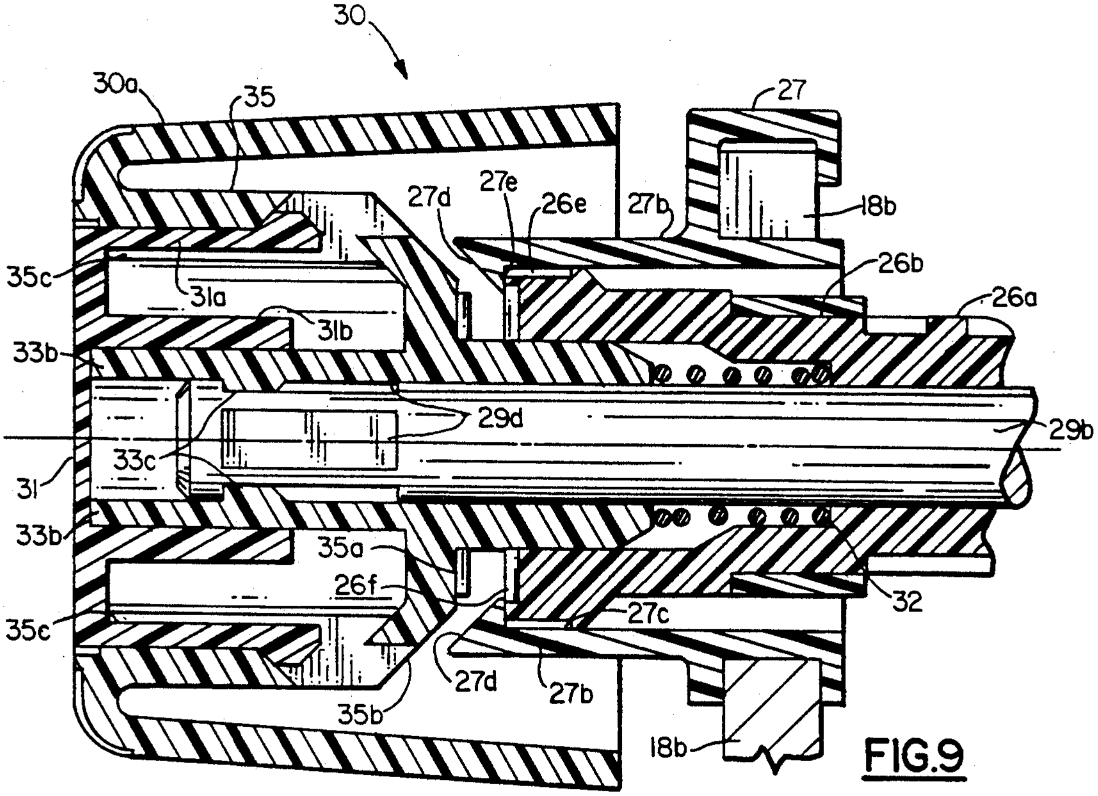
FIG. 9 is a side section of a portion of the tractor adjustment mechanism of FIG. 3 showing a first operating position of the knob element for rotating only one lead screw element.

As previously mentioned, knob 30 is shiftable axially on shaft extension 29*a* between two operative positions. In the first operative position as shown in FIG. 9, keys tabs 33*b* are against the back edge of key slots 29*d*. In this position, drive gearing 35*c* on web 35 and 26*f* on lead screw 26 are disengaged. Spring tab fingers 27*b* are spring loaded inwardly so that detent tabs 27*c* engage detention gearing 26*e* on drum 26*e* of lead screw 26 so that lead screw 26 is prevented from being rotated. The hooked ends 27*e* of spring tab fingers 27*b* engage the end of drum 26*c* of lead screw 26 thereby holding lead screw 26, against any axial movement on shaft extension 29*a* and within bore 27*a*. In this position, knob 30 can rotate shaft 29 and lead screw 25 to adjust the position of tractor 21 on drive shaft 23 and guide shaft 24.

Figure 10:
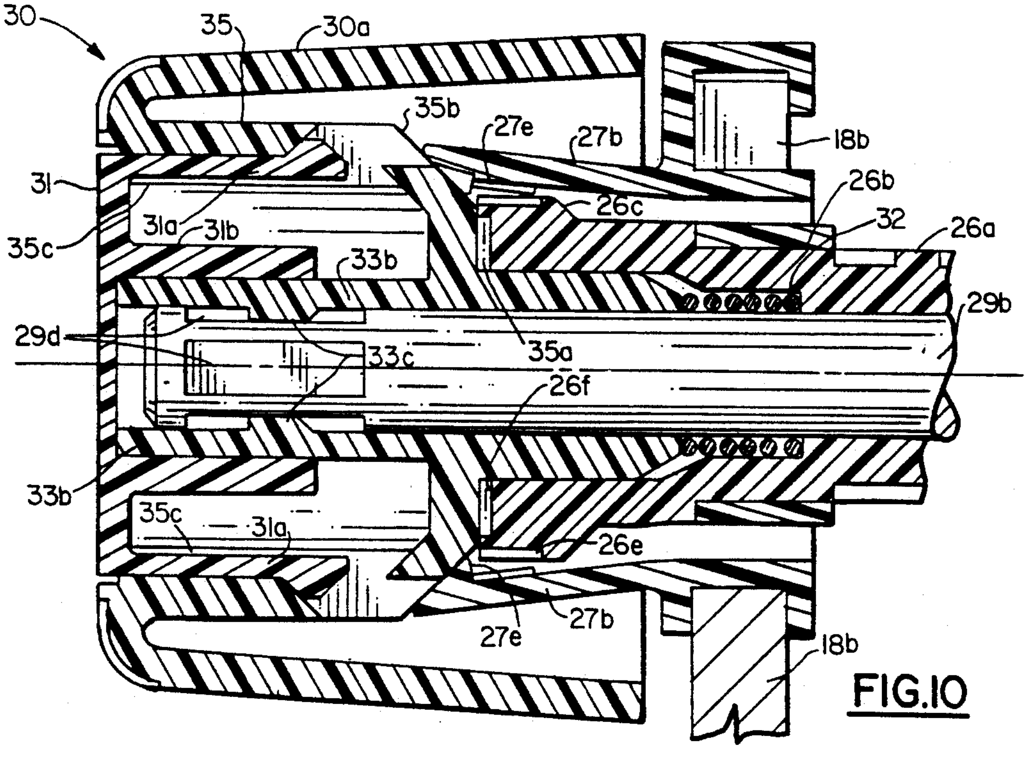
FIG. 10 is a side section of a portion of the tractor adjustment mechanism of FIG. 3 showing a second operating position of the knob element for rotating both lead screw elements.

In the second operative position of knob 30 as shown in FIG. 10, knob 30 has been slid along shaft extension 29*b*, key tabs 33*c* on spring fingers 33*b* have moved away from the back edge of key slots 29*d* and plunger 33*d* of central tube 33 has moved further into bore 26*d* of drum 26*c* of lead screw 26 further compressing spring 32. In this position of knob 30, drive gearing 35*a* on web 35 engages drive gearing 26*f* on drum 26*e* of lead screw 26 and conical surface 35*b* on web 35 engages tapered cam surfaces 27*d* on the ends of spring tab fingers 27*b* causing spring tab fingers 27*b* to be deflected outwardly and further spring loaded. In this position, hooked ends 27*e* of tab fingers 27*b* are deflected out of engagement. However because drive gearing 35*a* is held against gearing 26*f*, axial movement of lead screw 26 on shaft extension 29*a* is prevented. In this position also, detent tabs 27*c* are disengaged from gearing 26*e* of drum 26*c* thereby freeing lead screw 26 to be rotated by knob 30 together with rotation of lead screw 25. Thus both tractors 21 and 22 are movable together along the lead screws and the drive shaft.

Upon release of knob 30, it is moved toward the first position shown in FIG. 9 by the force from spring loading of tab fingers 27*b* and the camming action of the tapered cam surfaces 27*d* on cam surface 35*b* of web 35. Tab elements 27*c* become reengaged with detention gearing 26*e* on drum 26*c* thus preventing rotation of lead screw 26. Hook ends 27*e* reengage with the end of drum 26*c* thus holding lead screw 26 against axial movement on shaft extension 29*a*. Spring 32 completes the movement of knob 30 until key tabs 33*c* are again in contact with the edge of key slots 29*d*.

Thus in accordance with the invention, a tractor adjustment mechanism is provided which is both simple in structure and operation and is easy to assemble.

While the invention has been particularly shown and described with reference to a preferred embodiment thereof, it will be understood by those skilled in the art that various changes in form and details may be made therein without departing from the spirit and scope of the invention.

What is claimed is:

1. A paper feeding system comprising in combination
a pair of tractors for feeding paper relative to a print mechanism, and
an adjustment mechanism for moving the tractors to adjust for different widths of paper or to shift the paper relative to the print mechanism,
said adjustment mechanism comprising
a first lead screw member with a shaft extension and rotatable for moving a first of said tractors,
a tubular lead screw member on said shaft extension and rotatable for moving a second of said tractors,
said tubular lead screw member having anti-rotational detention means and rotary drive means,
detent means engageable with said detention means of said tubular lead screw member to prevent rotation thereof,
a rotatable operator element at one end of the tubular member and at one end of the shaft extension distal from the first lead screw, and movable axially on said shaft extension,
first operative means on said operator element having a rotary drive connection with said shaft extension to cause rotation of said first lead screw member,
second operative means on said operator element for engaging said drive means of said tubular lead screw member to enable rotation of said tubular lead screw member, and
third operative means on said operator element for disengaging said detent means from said detention means to release said tubular lead screw member for rotation by said operator element on said shaft extension,
said operator element being movable axially from a first operative position on said shaft extension at which said second and third operative means on said operator element are disengaged from said rotary drive means on said tubular lead screw member and said detent means respectively and only said first lead screw member is rotatable by said operator element and a second operative position at which said second and third operative means on said operator element are engaged with said rotary drive means on said tubular lead screw and said detent means respectively and said first and second lead screw members are jointly rotatable by said operator element.

2. A paper feed system for a printer comprising
a pair of tractors,
a drive shaft operatively connected to said tractors,
said tractors engaging opposite margins of paper for positively advancing said paper when driven by said shaft,
a supporting lead screw for each tractor in parallel with said drive shaft,
one lead screw being tubular and the other screw including a shaft-like extension extending therethrough,
said tubular screw being supported for rotation by said shaft-like extension,
detention means and a rotary drive means on said tubular screw,
detent means engageable with said detention means of said tubular screw for preventing rotation thereof, and a rotary operator element axially movable between first and second operative positions on said shaft-like extension of said one lead screw,
said rotary operator element having a first rotary drive means connected, in said first and second operative positions of said operator element, with said shaft-like extension for imparting rotary motion of said operator element to said one lead screw,
a second rotary drive means on said rotary operator element for engaging said rotary drive means of said tubular lead screw member when in said second operative position, and
disengagement means on said rotary operator for disengaging said detent means from said detention means when said second rotary drive means engages said rotary drive means of said tubular lead screw in said second operative position to thereby free said tubular lead screw for rotation by said rotary operator element jointly with said one lead screw.

3. A paper feed system in accordance with claim 2 wherein
said detention means includes gearlike means on said tubular lead screw,
said detent means comprises at least one detent member spring loaded for engagement with said gearing on said tubular member, and said disengagement means includes camming means on said operator element for disengaging said at least one detent member from said gearing on said tubular member.

4. A paper feed system in accordance with claim 2 wherein said detent means comprises at least one flexure beam member having a fixed end and deflectable end, said at least one flexure beam member having camming means and tab means near said deflectable end for engaging said detention means on said tubular lead screw, and said disengagement means includes camming means on said operator element cooperable with said camming means on said at least one flexure beam member for disengaging said tab means from said detention means on said tubular lead screw.

5. A paper feed system in accordance with claim 4 wherein said detention means on said tubular lead screw comprises gear teeth, and said tab means on said at least one flexure member of said detent means comprises gear teeth which mesh with said gear teeth on said tubular lead screw.

6. A paper feed system in accordance with claim 2 which further includes frame means and bearing means fixedly supported thereby, said tubular lead screw being rotatably supported on said frame means by said bearing means, and said at least one flexure beam member has said fixed end connected to said bearing means.

7. A paper feed system in accordance with claim 6 wherein said bearing means is a molded part and said at least one flexure beam member is integrally molded with said bearing means.

8. A paper feed system in accordance with claim 7 wherein said bearing means is snap fitted to said frame means.

9. A paper feed system in accordance with claim 6 wherein said tubular lead screw is slidable axially on said shaft extension of said first lead screw and in said bearing means, and said at least one flexure member further includes hook means at said deflectable end engageable with said tubular lead screw to prevent axial displacement of said tubular lead screw on said shaft extension.

10. A paper feed system in accordance with claim 2 wherein said first lead screw and said tubular lead screw are molded parts.

11. A paper feeding system comprising, in combination:

A pair of tractors for engaging with the rows of pin feed holes at each edge of continuous paper to feed the paper;

an axially fixed rotatable shaft extending through both tractors;

a first lead screw integral with the shaft along a first part of the shaft and engaged with a first of said tractors to adjust the position of the tractor along the shaft by rotating the shaft;

a hollow tube coaxial with the shaft and axially fixed in relation to the shaft and extending over a second part of the shaft for rotation of the tube independent of rotation of the shaft;

a second lead screw integral with the tube and engaged with a second of said tractors to adjust the position of the second tractor along the shaft by rotation of the tube; and operator means selectively engageable for rotating only one of the lead screws and selectively engageable for rotating both of the lead screws simultaneously.

12. The paper feeding system of claim 11, in which operator means includes a knob and both one end of the shaft and one end of the tube are positioned at the knob to communicate with the knob and the knob is selectively movable in one axial direction of the shaft and tube for said selectively engaging to rotate only one of the lead screws and selectively movable in the opposite axial direction of the shaft and tube for said selectively engaging to rotate both lead screws simultaneously.

13. The paper feeding system of claim 12, in which the knob is mounted on the shaft and rotationally fixed to the shaft to always rotate the shaft to move the first tractor along the shaft when the knob is rotated and selectively axially adjustable along the shaft, to selectively engage/disengage the hollow tube for selectively moving the second tractor along the shaft only when the knob is axially positioned to move the second tractor.

14. The paper feeding system of claim 11, further comprising detent means automatically engaged by axial movement of the knob for preventing rotation of one of said lead screws when said operator means is selectively engaged to rotate only the other said lead screw.

* * * * *